No. 796,318. PATENTED AUG. 1, 1905.
H. J. S. GILBERT-STRINGER.
APPARATUS FOR EQUABLY JUSTIFYING COMPOSED LINES OF TYPE.
APPLICATION FILED JULY 6, 1901.

Witnesses:

Inventor
Henry J. S. Gilbert-Stringer
By James L. Norris.
Atty.

No. 796,318.  
PATENTED AUG. 1, 1905.  
H. J. S. GILBERT-STRINGER.  
APPARATUS FOR EQUABLY JUSTIFYING COMPOSED LINES OF TYPE.  
APPLICATION FILED JULY 6, 1901.

No. 796,318. PATENTED AUG. 1, 1905.
H. J. S. GILBERT-STRINGER.
APPARATUS FOR EQUABLY JUSTIFYING COMPOSED LINES OF TYPE.
APPLICATION FILED JULY 6, 1901.

Witnesses:

Inventor
Henry J. S. Gilbert Stringer
By James L. Norris

No. 796,318. PATENTED AUG. 1, 1905.
H. J. S. GILBERT-STRINGER.
APPARATUS FOR EQUABLY JUSTIFYING COMPOSED LINES OF TYPE.
APPLICATION FILED JULY 6, 1901.

UNITED STATES PATENT OFFICE.

HENRY J. S. GILBERT-STRINGER, OF WESTBOURNE PARK, LONDON, ENGLAND.

APPARATUS FOR EQUABLY JUSTIFYING COMPOSED LINES OF TYPE.

No. 796,318.  Specification of Letters Patent.  Patented Aug. 1, 1905

Application filed July 6, 1901. Serial No. 67,315.

*To all whom it may concern:*

Be it known that I, HENRY JAMES SYDNEY GILBERT-STRINGER, a citizen of England, residing at 37 Tavistock Crescent, Westbourne Park, London, England, have invented a certain new and useful Apparatus for Equably Justifying Composed Lines of Type, (for which I have applied for a patent in Great Britain, dated January 22, 1901, No. 1,483,) of which the following is a specification.

My invention relates to apparatus for equably justifying composed lines of type, which apparatus operates in the following manner: The compositor, whether he composes by hand or by employing any known composing-machine, inserts between the words where justification will occur space-types of considerable thickness, and so forms a line of greater length than is required for the form. As each space-type is introduced by the compositor a slide is moved forward under a row of vertical folding wedges, the slide being moved under as many of these as there are spaces. The line of types is advanced along a raceway, its front end passing the point where the line should end a distance equivalent to the excess of the length of the line. A frame in which is mounted the slide above mentioned is raised through a height proportional to the excess length of line, and the slide rising with it presses upward the lower members of the folding wedges under which it has been moved, and thus expands those wedges by an amount equal to the excess of the length of the line. As the number of wedges thus expanded is equal to the number of spaces in the line and as each wedge is equally expanded, it follows that the expansion of each is a measure of the amount of thickness that would have to be removed from each space-type in order to reduce the line to the required length. A revolving milling-cutter normally occupies such a position that if one of the space-types were passed between it and a sliding gage the cutter would just touch the space, but not cut it. By a connection from the frame which causes elevation of the folding wedges the milling-cutter is advanced toward the gage the amount by which each of the wedges is expanded. As the line of types is advanced along the raceway a reciprocating feeler, which is arrested by all the types and spaces except the justifying space-types, which are lower than the others, passes over each justifying space-type as it comes under it, and thus puts in action mechanism which removes this type from the line, carries it in the sliding gage across the face of the milling-cutter, and then replaces it in the line. The justifying space-type as it passes the cutter has shaved off from it an amount of its thickness equal to the expansion of each of the folding wedges, and this is repeated for each of such space-types in the line, so that when they are all replaced in the line it is of the required length, and as all such space-types are reduced to the same thickness the line is equably justified.

I shall describe the mechanism by which the operations above briefly set forth are effected.

Fig. 18 is a plan.

Figure 1:
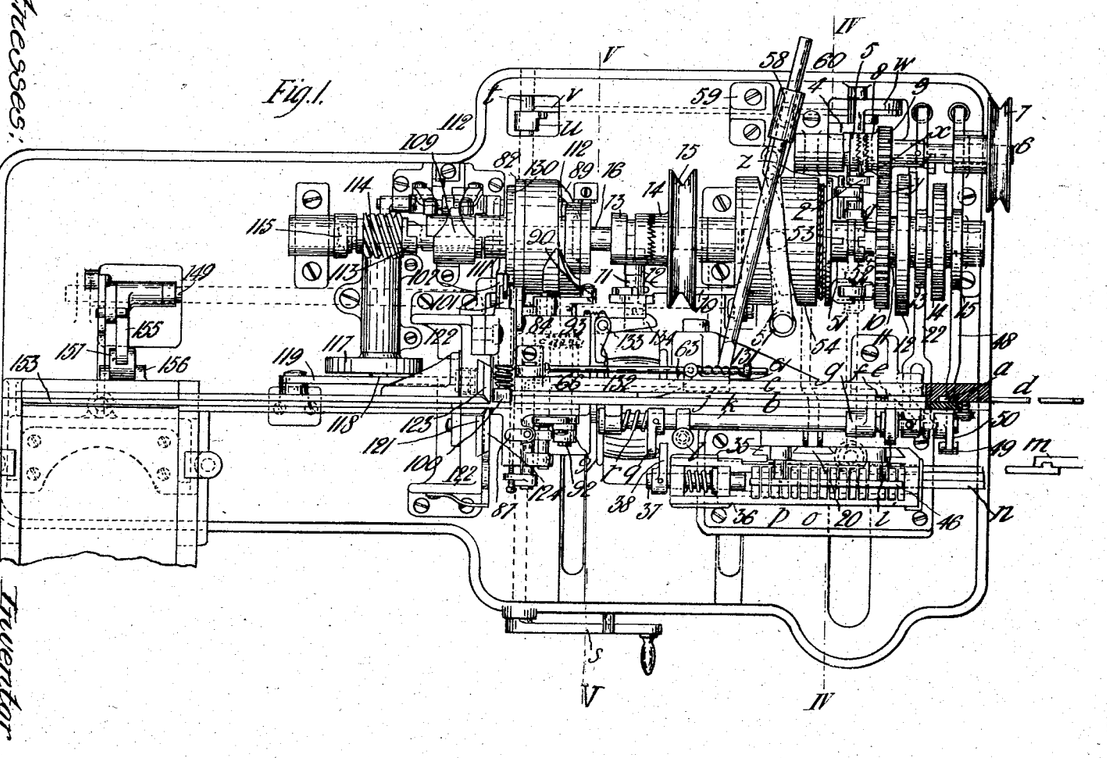
Figure 1 is a plan of the apparatus.
Figure 2:
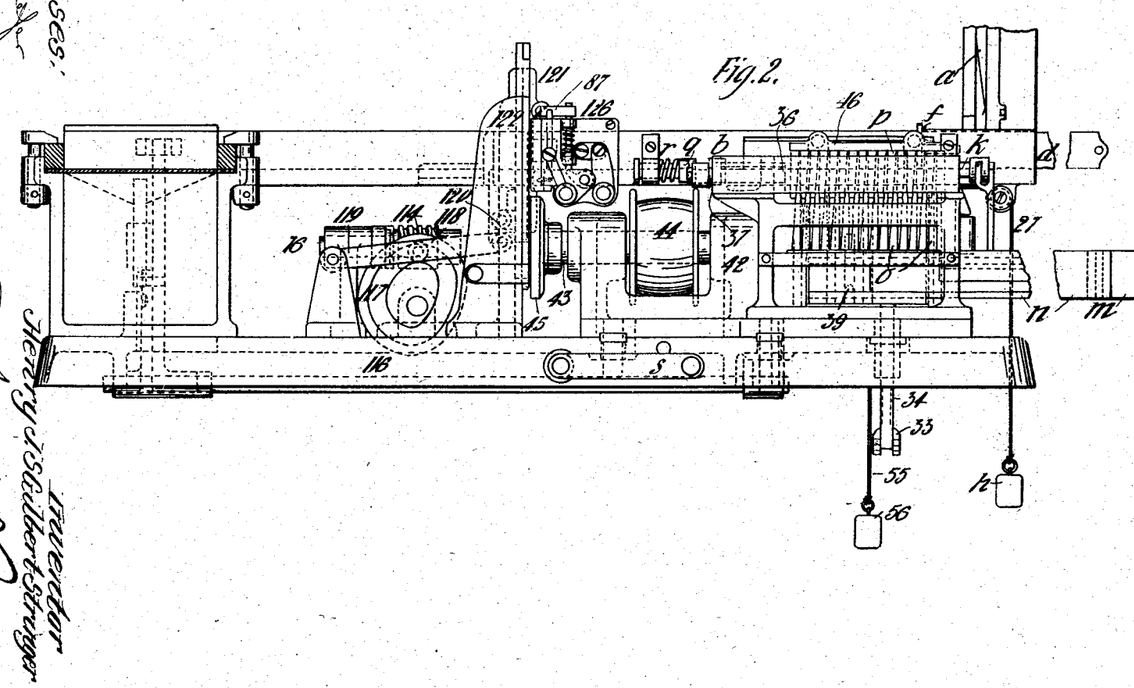
Fig. 2 is a front elevation.
Figure 3:
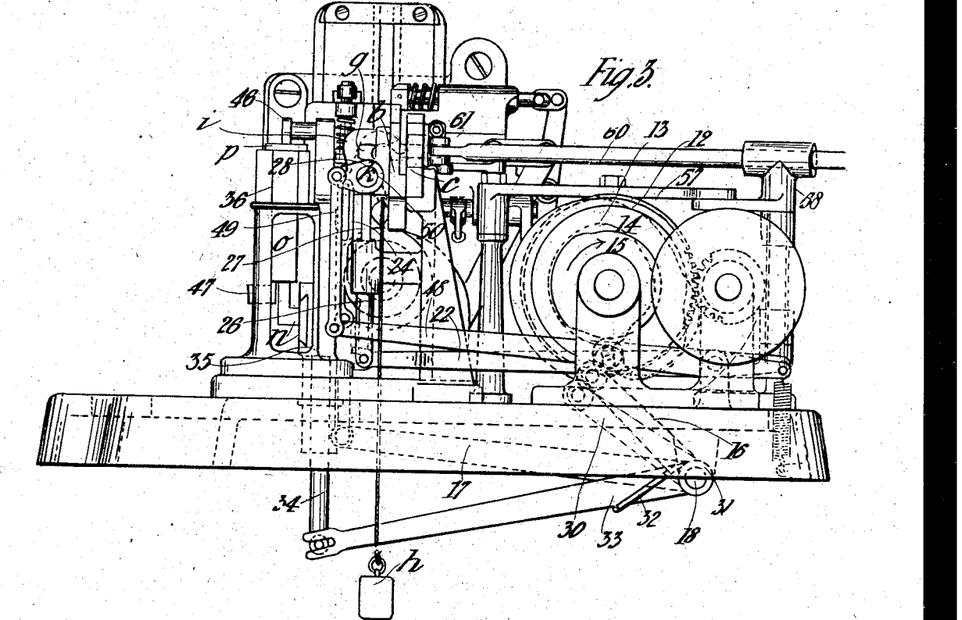
Fig. 3 is an end view looking from the right.
Figure 4:
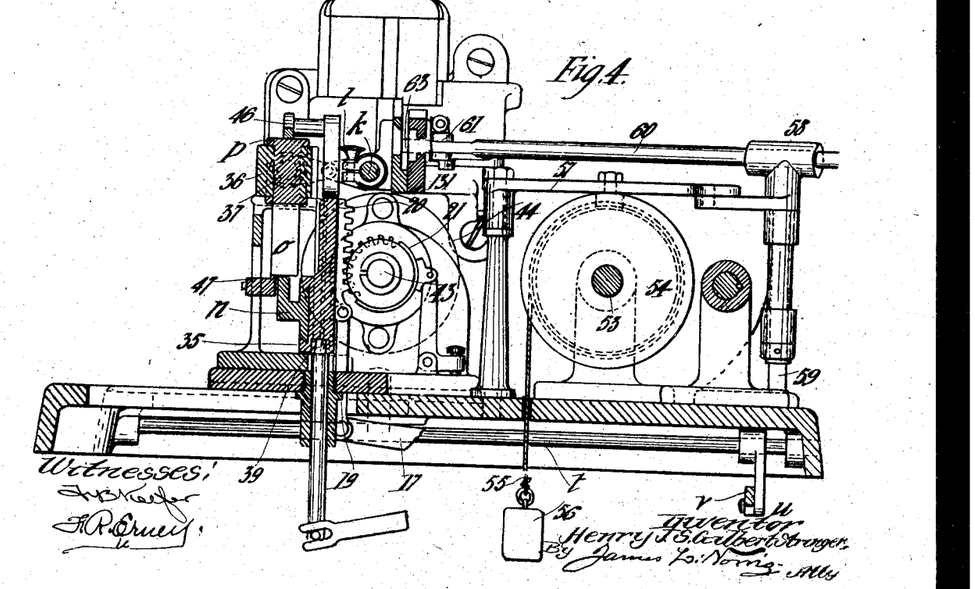
Figs. 4 and 5 are sections through the lines IV IV and V V, respectively, of Fig. 1.
Figures 14, 15:
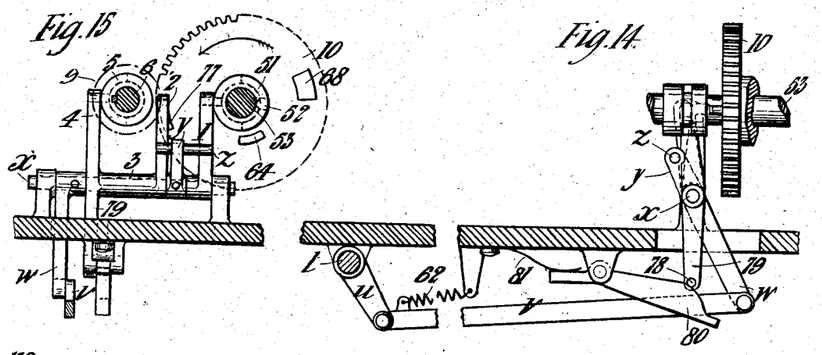
Figs. 14, 15, 16, and 17 are details of the mechanisms for starting and stopping the main and subsidiary shafts.

The mechanism is shown mounted upon a base-plate, thus furnishing a convenient means of attachment to any form of composing mechanism, it being only necessary that there should be provided in such mechanism the usual delivery-channel *a*, Figs. 1 and 2, and that when the character-keys of the composer are depressed the liberated types should be delivered through such channel into an assembling-raceway formed by two walls *b* and *c*, where they are advanced one by one by a reciprocating pusher *d*, which is also an adjunct of the composer, until they pass two retaining-latches *e* to the position shown at *f*, Figs. 1 and 2. The latches prevent the types from following the pusher in its back stroke, and in order that the types may not fall in the raceway, owing to momentum imparted by the advance of fresh types, there is provided a line-abutment $g$, which yields to the advancing types while sustaining them under pressure of a weight $h$. Before composition is commenced it is necessary that a rule corresponding in length to the length of line desired should be inserted as a gage-piece between the collar-piece of a locking-stop $i$ and the line-abutment $g$, after which a line-length collar $j$ is moved on a splined rod $k$ until it meets the line-abutment, when it is locked in that position by means of a set-screw $l$, and the rule being then withdrawn the apparatus is ready for justifying. In composing, depression of the space-key of the composer inserts after each word or group of character-types in the line a justifying-space. This space is of maximum thickness, giving a very wide spacing between the words, say an em-quad or more in set thickness. It is made of ordinary type-metal and is of the usual space height. If, however, it is desired to space between the character-types with spaces which shall retain their original thickness—as, for instance, at the commencement of a paragraph or as occurs in tabular matter—such spaces are in height equal to the shoulder of the character-types and being of such height cannot be withdrawn from the composition by the justifying mechanism and are liberated from other magazines operated by other keys. Depression of the space-key also operates a mechanism working in precisely the same manner as that by which the carriage of a type-writer is advanced, which advances, as hereinafter described, a connecting-piece $m$ to the left and with it a slide $n$ in such manner as to bring this slide step by step under a row of pairs of vertical folding wedges $o$ and $p$, the number of pairs under which the slide passes corresponding to the number of justifying-spaces in the line. As shown, the wedges $o$ and $p$ are arranged in pairs, each pair consisting of one wedge $o$ and one wedge $p$. The wedge $o$ of each pair is adapted to be moved along the face of the wedge $p$—in other words, fold thereon. Thus with the first space inserted the slide is brought under the first pair of wedges. With the second space it is brought also under the second pair of wedges, and so on. The line is composed so that it is overset or exceeds the desired length. The excess of length causes the line-abutment $g$ to move the collar $j$ and rod $k$ to the left by an amount equal to the surplusage. The rod $k$ also carries a tappet-arm $q$, for a purpose hereinafter described, and is urged to the right by a spring $r$. The operator, seeing that the line is overset or being warned of this by any suitable alarm, depresses a starting-lever $s$ and after removing his hand from the lever, thus allowing it to return to its former position, he resumes composition. This depression of the lever rocks a shaft $t$, Figs. 1 and 4, on the rear end of which is an arm $u$, connected by a rod $v$ to an arm $w$ of a second rocking-shaft $x$, Figs. 14 and 15, on which is another arm $y$, carrying a pin $z$. The pin is thus caused to simultaneously strike two levers 1 and 2 and drive them to the right. The lever 2 is part of a sleeve 3, which has on it a second lever 4, having a fork engaging a clutch-piece 5, splined on a constantly-running shaft 6, receiving its motion through a pulley 7, driven by the motor employed for the composer, and consequently by this motion the clutch-piece 5 is engaged with a second clutch-piece 8, formed on the boss of a pinion 9, freely mounted on the shaft 6, and thus a spur-wheel 10, with which the pinion gears, is rotated, and with it a sleeve 11, whereon are fixed four cams 12, 13, 14, and 15. Rotation of the cam 14, working through arms 16 and 17, Figs. 3 and 4, of a rocking shaft 18, a link 19, and sliding rack 20, partially rotates a pinion 21, and, as will be hereinafter explained, sets back to normal a milling-cutter 45. The cam 13 concurrently revolving allows a spring-urged forked lever 22 to rise, and one of its prongs 23, working in a slotted link 24, allows the stop-block $i$, which is freely mounted on the rod $k$, to partially rotate and enter the raceway through the wall $b$ at a point immediately behind the last type in the line. The continued upward movement of the lever 22 brings its second prong 25 into contact with and elevates a plunger 26, carrying a wedge-piece 27 into a slot 28, Fig. 13, in the rod $k$ until it makes contact with a pin 29 in the slot, thus locking the type between the line-abutment $g$ and the locking-stop $i$. When this is done, the cam 12, which bears against one arm 30 of a rocking sleeve 31, permits a spring 32 to partially rotate this sleeve, and the other arm 33 on the sleeve elevates a plunger 34, and with it a vertically-sliding frame 35. As this frame carries the transverse slide $n$, already described, this slide rises with it and acts on those of the wedge-pieces $o$ under which it has been brought, as previously described. By thus raising the wedges $o$ the folding wedges are expanded—that is to say, the width of the member $o$ of each pair of folding wedges is added in greater or less degree to that of the member $p$, so that the two elements of the wedge occupy greater space. In other words, the wedge is expanded in a box 36, in which they are contained, and the left-hand wedge-piece $p$ by its movement to the left drives out a spring-urged plunger 37, sliding in the end of the box 36, until checked by a tappet-arm 38, which it carries, encountering the tappet-arm $q$. The advance of the plunger 37 is consequently equal to the amount of the surplusage or overset in the line, and, as the number of wedge-pieces elevated is the same as the number of spaces in the line therefore the elevation of each wedge-piece causes a widening which is the quotient of the whole surplusage divided by the number of spaces, and consequently determines the reduction of width that has to be made in each space to bring the line to the required length. The milling-cutter 45 is normally in such a position as to just clear the face of a justifying-space if passed across it. The sliding frame 35 carries the rack-slide 20, and when a pin 39 encounters the foot of this rack-slide it elevates it, partially rotating the pinion 21, which has fixed to it a screwed sleeve 40, Figs. 6 and 8, working in a screwed cap 41, carried in a head 42. In the head 42 is mounted a shaft 43, on which is fixed a pulley 44, driven from the motor and having on its left end the milling-cutter 45. This shaft being loosely mounted in the screw-sleeve 40, its rotation is unimpeded; but its lateral movement is governed thereby. Consequently when the rack-slide 20 rotates the pinion 21 it working through the screwed sleeve 40 causes the milling-cutter to advance from its normal position or to return thereto. The screw of the sleeve is of such pitch as to advance the cutter a distance equal to the increase of width of each of the wedge pairs $o$ and $p$. After the cutter is thus advanced the cam 13 withdraws the wedge 27 and removes the locking-stop $i$ from behind the line of type and the cam 12 depresses the sliding frame 35 and those of the wedge-pieces $o$ that had been raised to their normal position by means of a depressor-bar 46 on its upper part. The wedge-pieces descend until checked by a bar 47 and the plunger 37 is returned to normal position by its spring. At the same time the cam 15 acting upon a lever 48, connecting rod 49 and short lever 50, which is attached to the end of the rod $k$, partially rotates this rod, withdrawing the line-abutment $g$ from its position in front of the line, leaving the line free to be advanced along the raceway in the following manner: By the depression of the starting-lever $s$ the pin $z$ moves the lever 1, causing it to throw a clutch-piece 51 into engagement with clutch-pins 52, mounted on the face of the spur-wheel 10. The clutch-piece is freely mounted on a fixed shaft 53, on which is the sleeve 11 and a freely-mounted barrel-cam 54. This cam is in constant engagement with the moving clutch-piece 51. Therefore the rotation of the spur-wheel 10 is transmitted to the drum 54 and winds up a cord 55, to which is attached a weight 56, and the cam-path on 54 causes a lever 57 to oscillate a T-piece 58, mounted in a bracket 59, which carries a sliding rod 60, this rod being attached to a line-carriage 61. The carriage is formed to slide in the wall $c$, and the described movement causes it to assume its extreme right position.

The starting-lever $s$ when released by the operator is returned to its normal position by a spring 62.

Figures 5, 6, 7, 8:
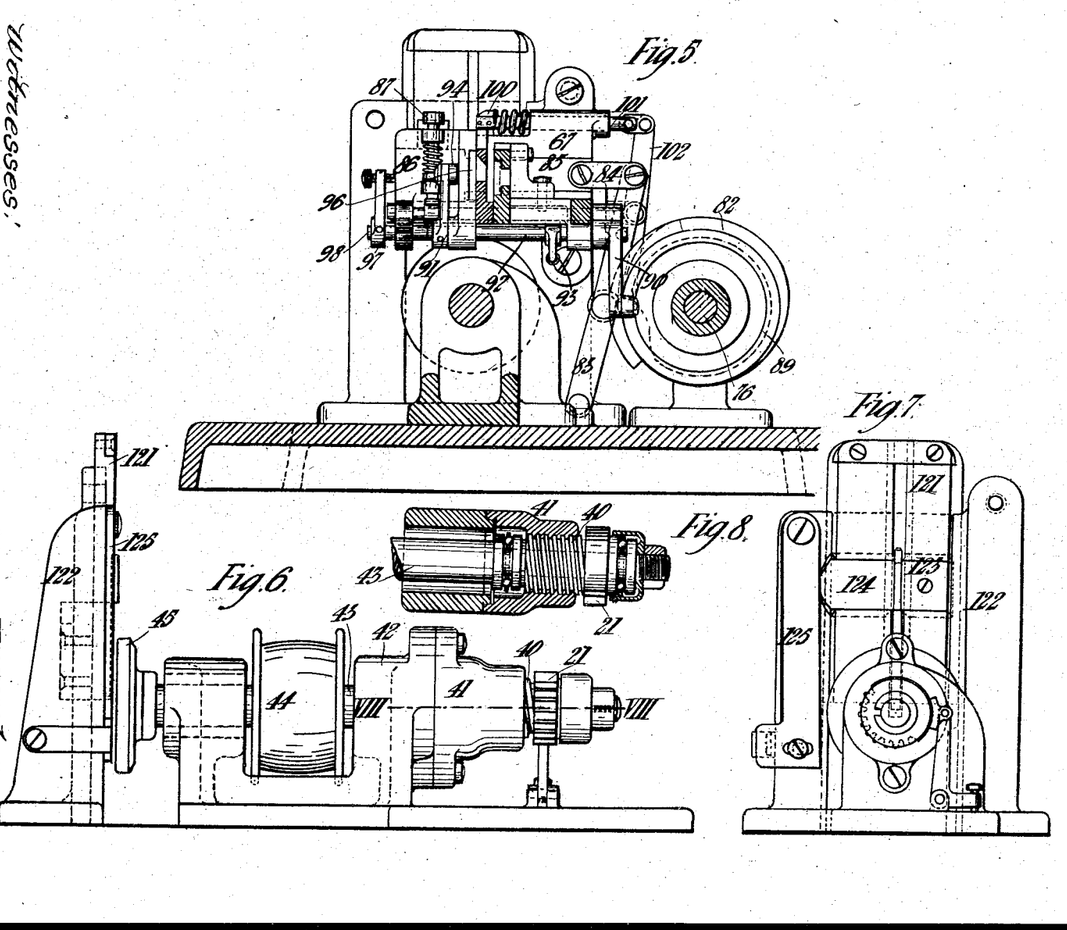
Fig. 6 is a front elevation of the milling-head and transfer-slide.
Fig. 7 is an end elevation of the same viewed from the right hand.
Fig. 8 is a part section through the line VIII VIII of Fig. 6.
Figure 9:
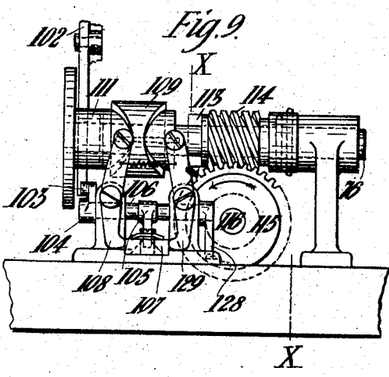
Fig. 9 is a rear elevation of the mechanism governing the transfer-slide.
Figure 10:
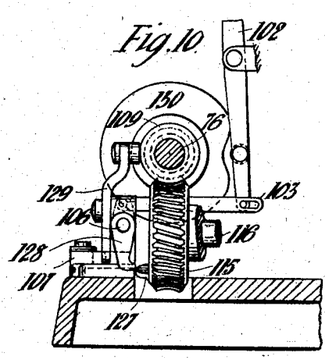
Fig. 10 is a section through the line X X of Fig. 9.
Figure 11:
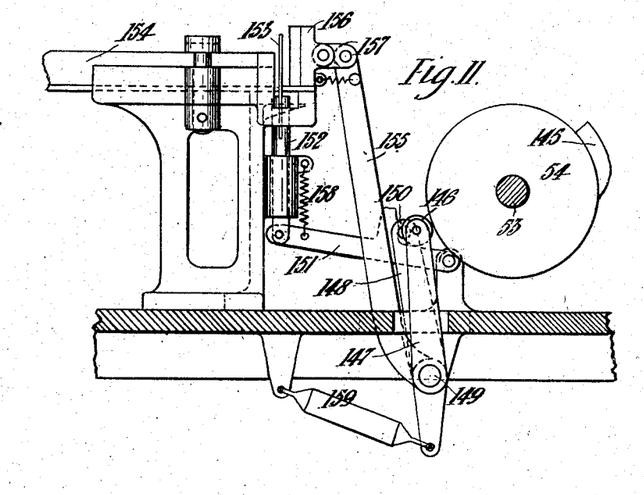
Fig. 11 is an end elevation of the galley and line-delivery mechanism.
Figures 12, 13:
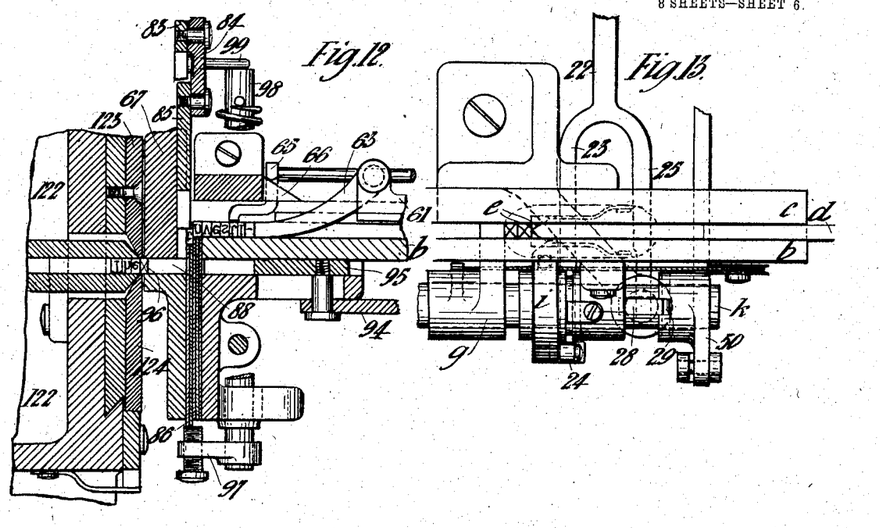
Fig. 12 is an enlarged sectional view of the separating and transferring mechanism.
Fig. 13 is an enlarged view of the line-locking mechanism.
Figure 16:
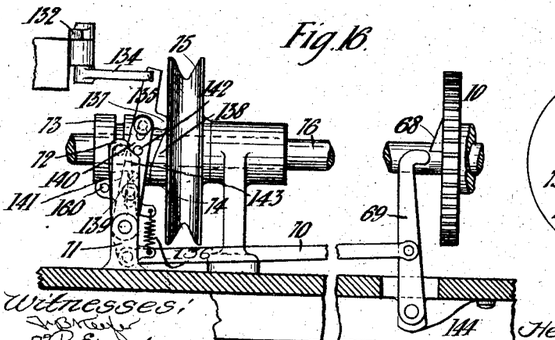
Figure 17:
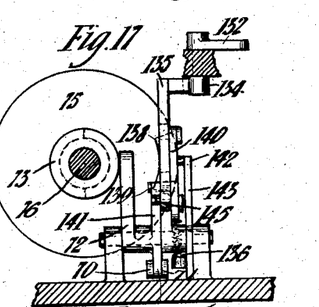

The line-carriage 61 has mounted on it a spring-urged finger 63, which passes through the wall $c$; but when in the movement described it encounters the foremost type of the line it leaves the channel, reëntering the same behind the line, the pusher $d$ being formed to allow the finger to intersect it. Upon its reaching this position a cam-piece 64 on the spur-wheel 10 encounters the lever 1 and disengages the clutch-piece 51 from the spur-wheel 10, allowing the weight 56 to rotate the cam 54 and advance the line-carriage to the left, the line being held between the finger 63 and a steady-piece 65, Fig. 12, attached to the line-carriage 61. When this steady-piece 65 encounters a cam-piece 66, it is removed from the raceway and the line moves forward until its foremost type is checked by reaching a wall 67, whereupon a cam-piece 68, Figs. 14, 15, 16, and 17, on the spur-wheel 10 engages a lever 69, moving a connecting-rod 70, partially rotating a rocking frame 71 and through an arm 72 engaging the clutch-piece 73 with another clutch-piece 74, formed on the boss of a constantly-rotating pulley 75, freely mounted on a shaft 76 and causing the shaft to rotate. As soon as the lever 69 is forced over, another cam-piece 77 on the face of the spur-wheel 10, acting through the lever 2, causes the sleeve 3 to oscillate, allowing a pin on a lever 79 to ride onto a curved cam-path formed on the end of a lever 80, a spring 81 urging the lever 79 of the rocking frame 3 farther forward and disengaging the clutch-piece 5 from the pinion 9, thus stopping the sleeve 11. With the rotation of the shaft 76 a cam 82, working through a lever 83 and a link 84, Fig. 5, actuates a separating-plunger 85, Fig. 12, mounted to slide in the face of the wall 67. This plunger is constructed to project beyond the wall an amount equal to the thinnest type of the font, and consequently the foremost type, whatever its thickness, being pressed against the wall when the plunger is advanced, is carried forward by it. The end of the wall $b$ opposite the plunger 85 consists of a number of thin steel strips 86, a sufficiency of these being provided to permit of the passage of the thickest type of the font; but only one type can be advanced at a time, and it carries with it only such a number of the strips as make up its thickness. This is owing to the fact that they are frictionally pressed on by a spring-urged presser-foot 87. The type is transferred by the separating-plunger 85 to a position opposite to a justifying-channel 88, where owing to the action of a cam 89, which works through the arms 90 and 91 of a rocking shaft 92 (in opposition to a spring 93) and a link 94, a plunger 95 (forked to embrace the strips 86, which have not been advanced) removes the types from between the separating-plunger 85 and such strips 86 as have accompanied it and forces it through the justifying-channel 88 to a position shown at 96 in Fig. 12. The strips are returned to their normal position by a tappet-arm 97, carried on the spring-propelled rod 98, which rod also by acting against a pin 99 returns the separating-plunger 85. As each succeeding type is brought to the position 96 a reciprocating feeler 100, carried on a spring-urged plunger 101, is urged by the spring against that part of the type which stands above the walls of the justifying-channel, these walls being equal in height to a justifying-space. Should it be a character-type or space which it is desired should maintain its original thickness, its height prevents farther advance of the plunger; but if it is a justifying-space, owing to its less height the feeler passes over it and permits the plunger 101 to make an increased stroke, by which a lever 102, linked to the plunger, strikes a connecting-rod 103, Figs. 9 and 10, and operating through two arms 104 and 105 of a rocking shaft 106 causes a sliding block 107 to obstruct an oscillating lever 108 and make it become stationary. This causes a sliding clutch-piece 109 on the shaft 76 to disengage itself from a clutch-piece 111 on the end of a sleeve 112 (which carries the cams 82 and 89, used in separating and transferring the types into the justifying-channel) and to bring such cams to rest, at the same time engaging with a clutch-piece 113. This clutch-piece is attached to a worm 114, which gears with a worm-wheel 115, fixed on one end of a shaft 116, carrying on its other end a path-cam 117, in which runs a roller 118 on a lever 119, which is connected by a link 120 to a vertically-moving slide 121, which is raised or lowered, according to the position of the path-cam 117. The slide 121, Figs. 6 and 7, is guided to move in a frame 122 and has two facing-pieces 123 and 124, the first fixed on the slide and the other movable horizontally upon it. The margins of these pieces are sloped off to narrow flats at their extreme edges, these flats forming a grip for a justifying-space between them, as shown at 96, Fig. 12. When the clutch-piece 109 engages the clutch-piece 113, the slide 121 begins to descend, and in so doing contact with the inclined edge of a spring-urged plate 125 causes the facing-piece 124 to bear against the justifying-space, gripping it and carrying it past a presser 126, by which it is steadied, so that in its continued descent, during which it is presented to the milling-cutter 45, only the requisite amount of its thickness is removed, after which the slide 121 ascends, returning the space thus reduced in thickness to the original position in the justifying-channel ready to be advanced by and give place to the next succeeding type. The complete revolution of the worm-wheel 115 brings a cam-piece 127 on it in contact with a lever 128, carried by the rocking shaft 106, and causes the sliding block 107 to interrupt an oscillating lever 129, throwing out the clutch-piece 109 and returning it into engagement with the clutch-piece 111, thus resuming the separating and transferring of the types. The cam 130 is used to retract the spring-urged reciprocating feeler 100, already described. When the last type in a line is removed by the separating-plunger 85, the finger 63, which had been following up the types, urged by its weight, passes through the plunger 85, which is slotted to accommodate it, and a pin 131 on the carriage 61, engaging one arm 132 of a spring-urged rocking shaft 133, Figs. 16 and 17, rocks this shaft, causing another arm 134 to disengage itself from the upper end of a lever 135. The lever 135 thus freed under the impulse of a spring 136 moves until a projection on it, 137, is placed in the path of a cam-piece 138 on the pulley 75. While this is being done a pin 139 on a slotted plate 140, fitted to slide up and down on the lever 135 and also urged by the spring 136, rides over the top face of a lever 141, carried by the rocking frame 71, thus allowing the plate 140 to descend. Consequently when the cam-piece 138 encounters the projection 137 the lever is urged forward and the pin 139, acting against the lever 141, partially rotates the frame 71 and the lever 72 throws the clutch-piece 73 out of engagement, thus stopping the mechanism. With the return of the lever 135 a pin 142 on the sliding plate 140 rides up the path of a cam-plate 143 and takes the pin 139 out of engagement with the lever 141, which is held in its normal position by a spring 144.

The manner in which the types are assembled in the galley is as follows: The length of the raceway from the point 96 to the inside of the right wall of the galley is a multiple of the length of line desired. Thus when the last type has been presented to the feeler at 96 there are three or four lines, as the case may be, between that point and the left wall of the galley. Therefore when the operator subjects a new line to the action of the justifier by depressing the starting-lever *s* there is always a complete line in the top of the galley. The barrel-cam 54 carries a cam 145, which, acting through a roller 146 two arms 147 and 148 of a rocking shaft 149, causes a pin 150 on the arm 148 to force over a lever 151 and lower a plunger 152 and a setting-rule 153 carried by it until the rule has been withdrawn below the bottom of a galley 154, carried by the main frame. In its continued movement the pin 150 acts against a lever 155 and drives forward a presser-bar 156, to which it is connected by a link 157, and forces the line of type into the galley, after which any disarrangement of the type is prevented by the rule rising through the floor of the galley impelled by the spring 158, and the presser-bar, urged by its spring 159, returns to its place, permitting another line to be advanced into the galley by the justifying mechanism. The usual furniture is inserted into the galley before the first line is introduced. The lever 135 is returned to engagement with the arm 134 by a pin 160, which engages with the back of the lever 141, retaining it until caught by the arm 134, being released by the return of the line-carriage preparatory to taking charge of a new line of types.

Figure 18:
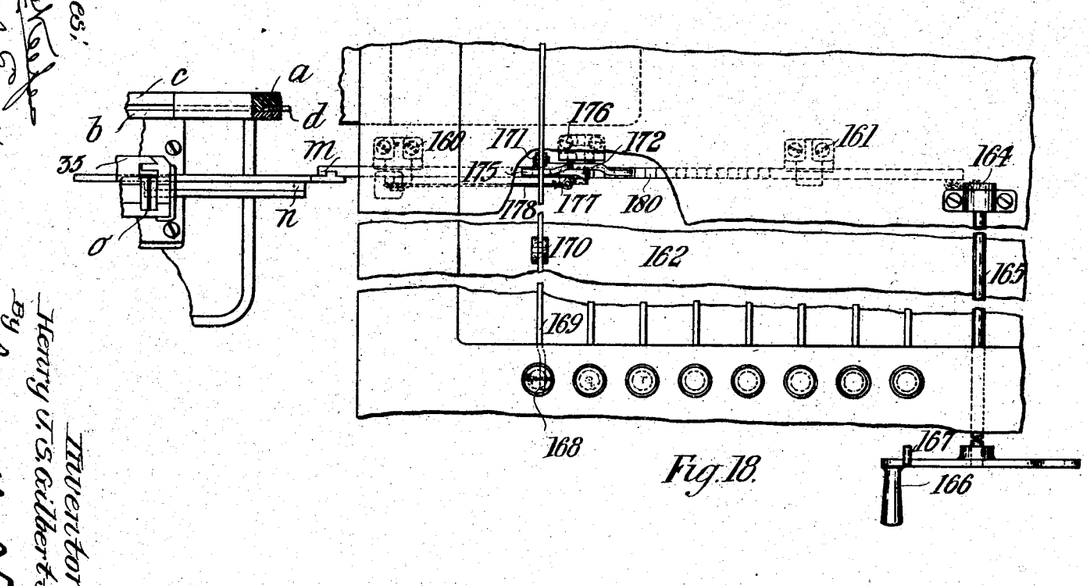
Figure 19:
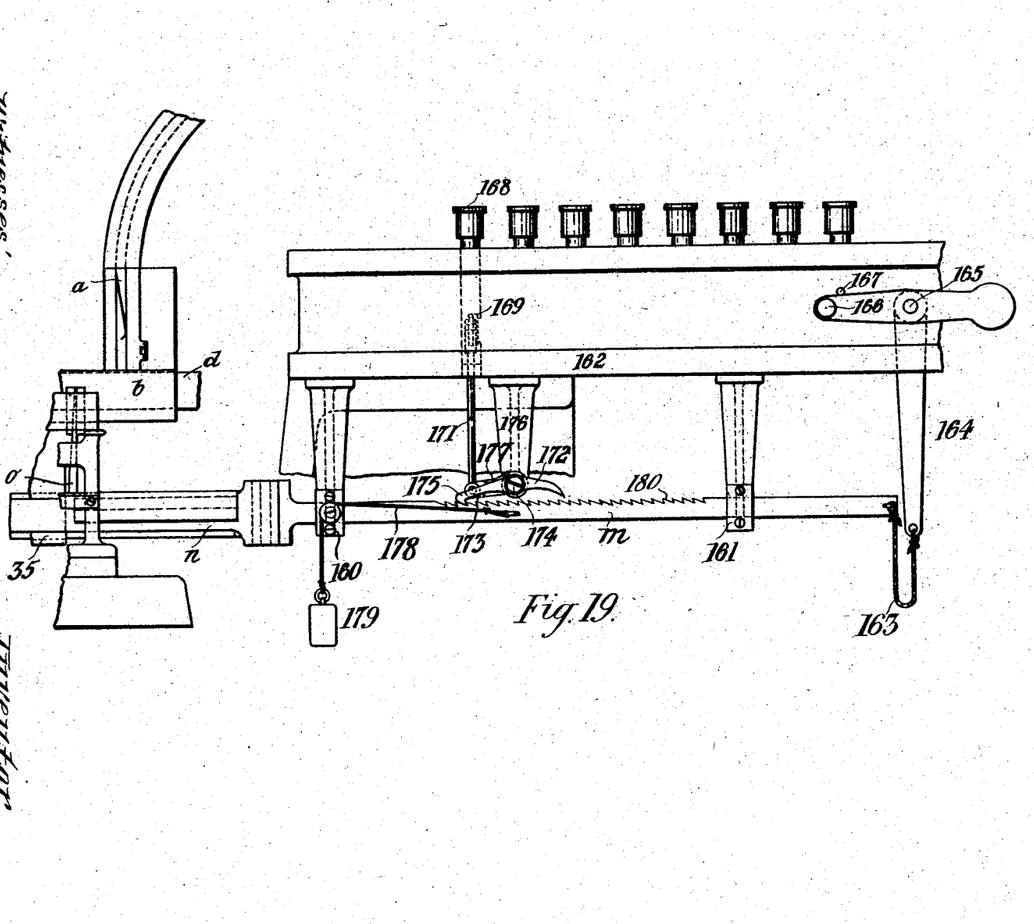
Fig. 19 is an elevation, showing part of a type-composing apparatus and its connection to the justifying apparatus.

As shown in Figs. 18 and 19, the step-by-step movement of the slide $n$ is effected as follows: Depression of the space-key 168 of the composing mechanism causes a justifying-space to be discharged from the magazine and introduced into the composition, and the space-key lever 169, which is pivoted at 170, having beyond its pivot attached to it a rod 171, elevates this rod, causing a pawl 172, pivoted at 174 on a bracket 176, to descend into the path of the teeth of the racks on the connecting-piece $m$, a lug 173, carried by the pawl 172, at the same time lifting another pawl 175, thus releasing $m$, which advances through its guides 160 and 161 under the impulse of a cord 178 and weight 179. When the space-key 168 is released, the pawl 178, impelled by a spring 177, again engages and holds the rack. The return of the connecting-piece $m$ to normal before each line of composition is commenced is effected by the operator depressing a lever 166, which, working through a rocking shaft 165, causes another lever 164 to take up the slack of a cord 163 and pull the connecting-piece $m$ back to its normal position.

Having thus described the nature of this invention and the best means I know of carrying the same into practical effect, I claim—

1. In an apparatus for justifying composed lines of type adapted to be spaced with spaces of considerable set width, the combination with means for introducing the spaces in the lines of type, of a series of folding wedges, a slide, stop mechanism for limiting the folding or expanding movement of the wedges, means for moving the slide under wedge after wedge of the series as space after space is introduced into the line, a sliding frame carrying said slide and arranged to cause said slide to expand said wedges, an adjustable space-cutter, and means for adjusting the space-cutter the action of which means is controlled by the degree of expansion of said wedge.

2. In an apparatus for justifying composed lines of types, the combination with a means for measuring the line of types and a space-manipulating means, of a revolving milling-cutter coöperating with said space-manipulating means, a head in which it is journaled, an adjusting-screw therein, a pinion and rack, a row of folding wedges, a vertically-sliding frame, and means for suitably operating said rack.

3. In an apparatus for justifying composed lines of types, the combination with a milling-cutter and means for sustaining the line of types, of a feeler reciprocating at such a level as to pass over the justifying space-types in the composed line but to be stopped by the other types and spaces which are to retain their set width, a gripper for the space-types, and means for moving the gripper with a justifying-space held in its jaws from the line, past the milling-cutter and back to the line.

4. In mechanism for justifying lines of composed type, the combination with means for transferring the type and spaces, one by one, from a space-channel to a justifying-channel, a reciprocating feeler, operating across the justifying-channel and arranged to pass over the spaces, means operated by the movement of said feeler for withdrawing the spaces from the line and returning same to the line, and means for trimming the spaces, substantially as described.

In testimony whereof I have hereunto set my hand in presence of two subscribing witnesses.

H. J. S. GILBERT-STRINGER.

Witnesses:
   GEO. J. B. FRANKLIN,
   WALTER J. SKERTEN.